Patented Nov. 28, 1950

2,531,468

UNITED STATES PATENT OFFICE 2,531,468

POLYVINYL SULFONATES AND PROCESS
FOR THEIR PREPARATION

Delbert D. Reynolds and William O. Kenyon, Rochester, N. Y., assignors to Eastman Kodak Company, Rochester, N. Y., a corporation of New Jersey No Drawing. Application April 14, 1949,
Serial No. 87,575

8 Claims. (Cl. 260—79.3)

1

This invention relates to polyvinyl sulfonates and to a process for preparing such polyvinyl sulfonates.

The reaction of sulfonyl chlorides with the simpler alcohols is well known. This reaction has also been applied to the preparation of various cellulose esters such as cellulose p-toluene sulfonate, cellulose methane sulfonate, and the like. The reaction has also been employed for the preparation of sulfonates of hydrolyzed interpolymers of ethylene and a vinyl organic ester. However, this reaction as carried out by such prior art processes does not give good results when applied to the sulfonation of polyvinyl alcohol. For example, when the sulfonation of polyvinyl alcohol is attempted by the process described in the aforementioned prior art for the sulfonation of hydrolyzed interpolymers of ethylene and a vinyl organic ester, no substantial sulfonation of the polyvinyl alcohol occurs. In the Journal of Ind. & Eng. Chemistry 41, pp. 617–621 (1949), E. F. Izard and P. W. Morgan describe a process for preparing polyvinyl p-toluene sulfonate by heating a mixture of p-toluenesulfonyl-chloride and a suspension of polyvinyl alcohol in pyridine to a temperature of 65° C., until the mixture becomes clear and homogeneous. The product they obtained, by analysis contained 9.05% by weight of sulfur equivalent to only 56% by weight of vinyl p-toluene sulfonate units or 22 mol per cent substitution of hydroxyl groups by p-toluene sulfonate groups. We found that sulfonation of polyvinyl alcohol in the presence of pyridine at temperatures appreciably above 20° C. favored side reactions which resulted in inferior sulfonated products and extremely low yields of such sulfonated products. These side reactions we found were (1) the reaction of vinyl sulfonate units with the formed pyridine hydrochloride to form vinyl chloride units; (2) the reaction of vinyl sulfonate units with pyridine to form quaternized units; and (3) the intramolecular reaction of vinyl sulfonate units with a vinyl alcohol unit to form tetrahydropyrane type rings. The side reactions can be illustrated by the following equations:

(1)

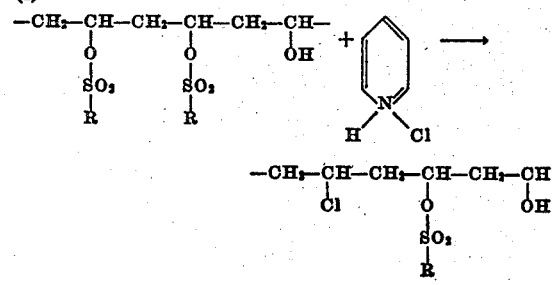

2

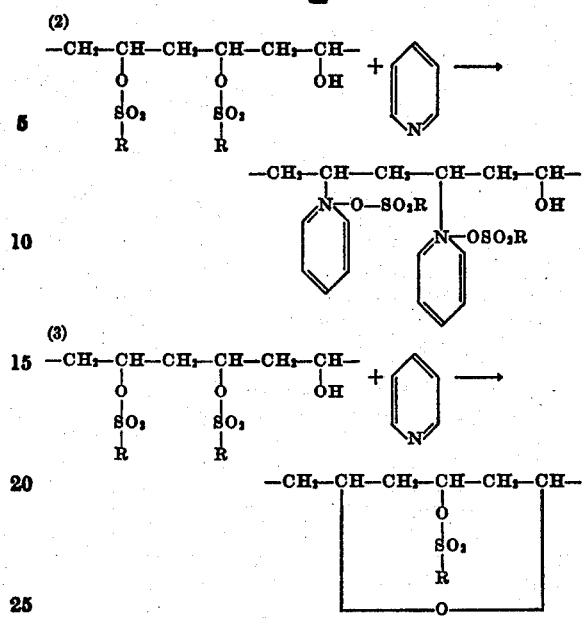

The preparation of quaternary salts by reaction of a tertiary amine on the polyvinyl sulfonates of the invention as illustrated in above side-reaction (2) is described and claimed in our co-pending application Serial No. 87,577, filed of even date herewith.

We have now found that the disadvantages of the prior art processes can be overcome by first heating the polyvinyl alcohol in pyridine, until the polyvinyl alcohol becomes swollen, and then cooling the mixture to a temperature range of from 0° to 20° C., for the sulfonation step with an organic sulfonyl chloride, the temperature being within this range during the entire period of sulfonation. The yield of the desired polyvinyl sulfonate is considerably higher than that obtained by prior art processes and the amount of unreacted hydroxyl groups remaining in the sulfonated product is relatively low.

It is, accordingly, an object of the invention to provide high quality polyvinyl sulfonates. Another object is to provide a process for preparing such polyvinyl sulfonates. Other objects will become apparent hereinafter.

In accordance with the invention, polyvinyl sulfonates characterized by the fundamental sulfonate unit:

repeated $n$ times, and wherein R represents an alkyl group (e. g., methyl, ethyl, propyl, butyl, etc.), an aryl group (e. g. phenyl, tolyl, naphthyl, etc.) a p-nitrophenyl group, a p-bromophenyl group or an aralkyl group (e. g. benzyl, phenylethyl, etc.), can be prepared by the process of first heating the polyvinyl alcohol in pyridine at a temperature of from 50° to 115° C., until the polyvinyl alcohol becomes swollen and in condition for smooth sulfonation, then cooling the mixture of polyvinyl alcohol and pyridine to a temperature of from 0° to 20° C., and then reacting the treated and swollen polyvinyl alcohol with the desired organic sulfonyl chloride, while continuing to maintain the temperature in the 0° to 20° C. range. Ordinarily the polyvinyl alcohol goes gradually into solution as the sulfonation proceeds, until a uniform solution results. However, this is not entirely the case with the reaction of the treated polyvinyl alcohol with methane sulfonyl chloride, because the resulting polyvinyl methane sulfonate is only partially soluble in the reaction mixture. The polyvinyl sulfonates produced in solution in pyridine as above described can then be recovered from the reaction mixture by conventional methods generally employed for separating a reaction product from its reaction mixtures. While the pretreatment step of heating the polyvinyl alcohol with pyridine is preferably carried out in substantially anhydrous conditions, i. e., with only about 4% of moisture naturally contained in the polyvinyl alcohol, it is perfectly feasible to carry out this step with as much as 5% by weight of water based on the combined weight of the polyvinyl alcohol and the pyridine. However, the presence of added water requires the additional step of separating the treated and swollen polyvinyl alcohol from the moist pyridine as otherwise an undue amount of the sulfonating agent will be used up in reacting with the water in the sulfonating step of the process. The proportion of pyridine to the polyvinyl alcohol is not critical in the pretreatment step, but inasmuch as the final sulfonated product is soluble in the pyridine, from 10 to 20 parts by weight of pyridine to each part by weight of the polyvinyl alcohol is the most advantageous. However, the only real limitation is that if the solids are too high, the final solution containing the polyvinyl sulfonate in pyridine will be too viscous for efficient handling. The time required to bring about sufficient swelling of the polyvinyl alcohol particles in the pretreatment step also is not critical. For example, when a steam bath is used, 10 minutes heating of the mixture is quite sufficient, although a longer time is not disadvantageous. No noticeable difference appears between those heated on the steam bath for only 10 minutes and those heated for as long as 15 hours.

The polyvinyl sulfonates of the invention are valuable intermediates for the preparation of other useful resinous compounds. Thus, they can be converted to amino derivatives by reacting them with primary or secondary amines (e. g. methylamine, dimethylamine, ethylamine, diethylamine, n-propylamine, n-dipropylamine, n-butylamine, n-dibutylamine, cyclohexylamine, dicyclohexylamine, aniline, methylaniline, morpholine, benzylamine, dibenzylamine, diphenylamine, piperidine, etc.), the sulfonic acid groups being partially or completely replaced by amino groups, depending upon the reaction conditions employed.

Suitable sulfonating agents include alkane sulfonyl chlorides (e. g. methane sulfonyl chloride, ethane sulfonyl chloride, propane sulfonyl chloride, butane sulfonyl chloride, etc.) or aromatic sulfonyl chlorides (e. g. benzene sulfonyl chloride, p-toluene sulfonyl chloride, p-nitrobenzene sulfonyl chloride, p-bromobenzene sulfonyl chloride, α-naphthalene sulfonyl chloride, β-naphthalene sulfonyl chloride, etc.). The amount of sulfonating agent can be varied advantageously from just enough of the agent to react with all of the hydroxyl groups of the polyvinyl alcohol and with any water which may be present to a considerable excess, but preferably for efficient operation from 1 to 3 gram moles of the sulfonating agent to each gram mole (44 grams) of polyvinyl alcohol.

The following examples will serve further to illustrate the polyvinyl sulfonates of the invention and the manner of preparing the same.

*Example 1.—Polyvinyl benzene sulfonate*

(a) 44 grams of polyvinyl alcohol were placed in 500 cc. of pyridine. The mixture was heated on a steam bath at 80° to 90° C. for a period of 10 minutes. It was then cooled at once to 5–10° C. and diluted with one liter of pyridine. There were then added 265 grams of benzene sulfonyl chloride and the mixture maintained at a temperature of from 5° to 10° C. for 24 hours. At the end of this time, an equal volume of acetone was added and the resulting dope was then poured slowly into a larger volume of water. A white, fibrous precipitate of polyvinyl benzene sulfonate was thus obtained. It was separated, leached in water and dried, after which it was redissolved in acetone, the acetone solution filtered, and reprecipitated into water, leached in water and dried. Analysis gave 16.0% of S equivalent to 92% by weight of vinyl benzene sulfonate units or 74 mol per cent.

(b) 44 grams of polyvinyl alcohol containing approximately 4% by weight of moisture were heated at 110° C. for a period of 15 hours. The thoroughly dried alcohol was then added to 500 cc. of anhydrous pyridine which had been previously distilled over calcium hydride. This mixture was then heated on a steam bath at 80° to 90° C. for 2 hours, after which it was sulfonated as described in above Example 1. The sulfonation reaction proceeded smoothly and the precipitated and purified polyvinyl benzene sulfonate on analysis gave 15.8% of S which calculates to 91% by weight of vinyl benzene sulfonate units which is equivalent to 70 mol per cent.

(c) 44 grams of polyvinyl alcohol were placed in 200 cc. of pyridine and allowed to stand at room temperature (25° to 30° C.) for a period of 15 days. One liter of pyridine was then added. To this mixture, there were added 265 grams of benzene sulfonyl chloride and the whole stirred at 5° to 10° C. for 24 hours. After this time, there had been no appreciable gain in viscosity, and when the stirring was stopped, the polyvinyl alcohol settled to the bottom of the flask. Analysis of this product showed that it contained no sulfur. In other words, the sulfonation reaction had not taken place under these reaction conditions.

*Example 2.—Polyvinyl p-toluene sulfonate*

44 grams of polyvinyl alcohol were heated on a steam bath for 2 hours with 500 c. c. of pyridine. The mixture was then cooled, transferred to a 3-necked flask equipped with a glass stirrer, a thermometer and a stopper. One liter of pyridine was added and the mixture cooled to 5° to 10° C. There were then added 285 grams of p- toluene sulfonyl chloride in one portion and the reaction mixture stirred for 24 hours, while maintaining the mixture at a temperature of 5° to 10° C. At the end of this time, an equal volume of acetone was added and the reaction mixture was then poured into water, the precipitate of polyvinyl p-toluene sulfonate thus obtained being separated, leached in water and dried. It was then dissolved in acetone, the solution filtered, and reprecipitated into water and again leached out in water and dried. Analysis of the purified polymer gave 15.3% by weight of sulfur corresponding to approximately 95% by weight of vinyl p-toluene sulfonate units or equivalent to 81 mol per cent substitution of hydroxyl groups by p-toluene sulfonate groups.

*Example 3.—Polyvinyl naphthalene sulfonate*

By using the same technique as described in Example 2, polyvinyl naphthalene sulfonate was prepared by reacting 341 grams of naphthalene β-sulfonyl chloride with 44 grams of polyvinyl alcohol. The polyvinyl naphthalene sulfonate thus prepared was purified by dissolving in pyridine, filtering the solution obtained, and precipitating into water, followed by leaching with water and drying. Analysis gave 11.3% of S equivalent to 83% by weight of vinyl naphthalene sulfonate units or 47 mol per cent.

*Example 4.—Aminated polyvinyl benzene sulfonate*

30 grams of polyvinyl benzene sulfonate prepared as described in Example 1 were thoroughly dried over P2O5 in vacuum at room temperature. The dried sulfonate compound was then placed in a flask bottle, 150 c. c. of piperidine added and the flask evacuated. Nitrogen was then passed into the flask, after which the flask was stoppered. The mixture was kept at a temperature of 50° C. for a period of 6 days. At the end of this time, the solution which had formed was filtered and precipitated into water. The aminated product separated out as a yellow precipitate, which was leached in water, dried, dissolved in ether, filtered, and reprecipitated in water. This product was again leached in water and dried. It was insoluble in water, but soluble in dilute acids. Analysis indicated that the purified product was substantially polyvinyl piperidine.

The invention is not limited to the specific compounds of the examples, since any polyvinyl sulfonate in which R is an alkyl, aryl or aralkyl group, as previously defined, can be prepared by the processes described in the examples. Other polyvinyl sulfonates which were prepared were polyvinyl methane sulfonate, polyvinyl ethane sulfonate, polyvinyl propane sulfonate, polyvinyl butane sulfonate, polyvinyl p-nitrobenzene sulfonate, polyvinyl p-bromobenzene sulfonate, polyvinyl benzyl sulfonate, polyvinyl phenylethyl sulfonate, and the like.

The degree of sulfonation obtained by the method of the invention cannot be increased by resulfonation. For example, the polyvinyl p-toluene sulfonate described in Example 2 was dissolved in pyridine, cooled to 5° to 10° C., and stirred with an excess of p-toluene sulfonyl chloride for a period of 24 hours. There was no increase in the percentage of sulfur. This result was also found to be true for all the other polyvinyl sulfonates prepared as described in the preceding examples, indicating thereby that sulfonation of any remaining hydroxyl groups is hindered by steric effects.

We claim:
1. A process for preparing polyvinyl sulfonates comprising swelling polyvinyl alcohol by heating the polyvinyl alcohol in pyridine at a temperature of from 50° to 115° C., cooling the polyvinyl alcohol-pyridine mixture to from 0° to 20° C. and then adding a sulfonating agent having the general formula:

R—SO2—Cl wherein R represents a member selected from the group consisting of an alkyl group, an aryl group, a p-nitrophenyl group, a p-bromophenyl group and an aralkyl group, to the polyvinyl alcohol-pyridine mixture and maintaining the resulting reaction mixture at from 0 to 20° C. during the reaction.

2. A process for preparing polyvinyl sulfonates comprising swelling polyvinyl alcohol by heating the polyvinyl alcohol in pyridine at a temperature of from 50° to 115° C., cooling the polyvinyl alcohol-pyridine mixture to from 0° to 20° C. and then adding a sulfonating agent having the general formula:

R—SO2—Cl wherein R represents an alkyl group, to the polyvinyl alcohol-pyridine mixture and maintaining the resulting reaction mixture at from 0° to 20° C. during the reaction.

3. A process for preparing polyvinyl sulfonates comprising swelling polyvinyl alcohol by heating the polyvinyl alcohol in pyridine at a temperature of from 50° to 115° C., cooling the polyvinyl alcohol-pyridine mixture to from 0° to 20° C. and then adding a sulfonating agent having the general formula:

R—SO2—Cl wherein R represents an aryl group, to the polyvinyl alcohol-pyridine mixture and maintaining the resulting reaction mixture at from 0° to 20° C. during the reaction.

4. A process for preparing polyvinyl sulfonates comprising swelling polyvinyl alcohol by heating the polyvinyl alcohol in pyridine at a temperature of from 50° to 115° C., cooling the polyvinyl alcohol-pyridine mixture to from 0° to 20° C. and then adding a sulfonating agent having the general formula:

R—SO2—Cl wherein R represents an aralkyl group to the polyvinyl alcohol-pyridine mixture and maintaining the resulting reaction mixture at from 0° to 20° C. during the reaction.

5. A process for preparing polyvinyl methane sulfonate comprising swelling polyvinyl alcohol by heating the polyvinyl alcohol in pyridine at a temperature of from 50° to 115° C., cooling the polyvinyl alcohol-pyridine mixture to from 0° to 20° C. and then adding methane sulfonyl chloride to the polyvinyl alcohol-pyridine mixture and maintaining the resulting reaction mixture at from 0° to 20° C. during the reaction.

6. A process for preparing polyvinyl benzene sulfonate comprising swelling polyvinyl alcohol by heating the polyvinyl alcohol in pyridine at a temperature of from 50° to 115° C., cooling the polyvinyl alcohol-pyridine mixture to from 0° to 20° C. and then adding benzene sulfonyl chloride to the polyvinyl alcohol-pyridine mixture and maintaining the resulting reaction mixture at from 0° to 20° C. during the reaction.

7. A process for preparing polyvinyl benzyl sulfonate comprising swelling polyvinyl alcohol by heating the polyvinyl alcohol in pyridine at a temperature of from 50° to 115° C., cooling the polyvinyl alcohol-pyridine mixture to from 0° to 20° C. and then adding benzylsulfonyl chloride to the polyvinyl alcohol-pyridine mixture and maintaining the resulting reaction mixture at from 0° to 20° C. during the reaction.

8. A process for preparing polyvinyl naphthalene sulfonate comprising swelling polyvinyl alcohol by heating the polyvinyl alcohol in pyridine at a temperature of from 50° to 115° C., cooling the polyvinyl alcohol-pyridine mixture to from 0° to 20° C. and then adding naphthalene β-sulfonyl chloride to the polyvinyl alcohol-pyridine mixture and maintaining the resulting reaction mixture at from 0° to 20° C. during the reaction.

DELBERT D. REYNOLDS.
WILLIAM O. KENYON.

REFERENCES CITED

The following references are of record in the file of this patent:

UNITED STATES PATENTS

| Number | Name | Date |
| --- | --- | --- |
| 2,395,347 | Sharkey | Feb. 19, 1946 |

OTHER REFERENCES

Izard: Industrial and Engineering Chemistry, vol. 41, pages 617–621 March 1949.